(12) United States Patent
Chen et al.

(10) Patent No.: US 9,750,049 B2
(45) Date of Patent: Aug. 29, 2017

(54) USING COMMUNICATION DEVICES FOR PROVIDING NETWORK ACCESS

(71) Applicant: QUALCOMM Incorporated, San Diego, CA (US)

(72) Inventors: Xuetao Chen, Fremont, CA (US); Chen Chen, Sunnyvale, CA (US); Eyal Hochdorf, Palo Alto, CA (US)

(73) Assignee: QUALCOMM Incorporated, San Diego, CA (US)

( * ) Notice: Subject to any disclaimer, the term of this patent is extended or adjusted under 35 U.S.C. 154(b) by 77 days.

(21) Appl. No.: 14/858,141

(22) Filed: Sep. 18, 2015

(65) Prior Publication Data

US 2017/0086223 A1     Mar. 23, 2017

(51) Int. Cl.
| | | |
|---|---|---|
| *H04W 74/02* | (2009.01) | |
| *H04W 72/08* | (2009.01) | |
| *H04W 74/00* | (2009.01) | |
| *H04W 88/08* | (2009.01) | |

(52) U.S. Cl.
CPC ......... *H04W 74/02* (2013.01); *H04W 72/082* (2013.01); *H04W 74/002* (2013.01); *H04W 88/08* (2013.01)

(58) Field of Classification Search
CPC ....... H04W 8/00; H04W 24/00; H04W 36/00; H04W 74/00
See application file for complete search history.

(56) References Cited

U.S. PATENT DOCUMENTS

| | | |
|---|---|---|
| 7,103,806 B1 | 9/2006 | Horvitz |
| 7,574,202 B1 | 8/2009 | Tsao et al. |
| 8,483,092 B2 | 7/2013 | de Sousa |
| 8,553,729 B2 | 10/2013 | Zhang |
| 2004/0025047 A1 | 2/2004 | Mayne et al. |
| 2005/0099943 A1* | 5/2005 | Naghian ........... H04W 72/1236 370/229 |
| 2008/0165766 A1* | 7/2008 | Synnergren ............ H04L 12/66 370/352 |

(Continued)

FOREIGN PATENT DOCUMENTS

WO     2015012585 A1     1/2015

OTHER PUBLICATIONS

International Search Report and Written Opinion—PCT/US2016/047471—ISA/EPO—Nov. 17, 2016.

(Continued)

*Primary Examiner* — Mohamed Kamara
(74) *Attorney, Agent, or Firm* — The Marbury Law Group (57) ABSTRACT

Described herein are apparatuses, methods, and computer readable media for using a communication device for providing network access to network devices on a network. An exemplary communication device may provide voice communication to a network device or a device other than the network device, and also provide network access to the network device. In order to provide network access, the communication device may comprise a network communication unit. In order to provide voice communication, the communication device may comprise a telecommunication unit. Both the network communication unit and the telecommunication unit may be activated or deactivated by the communication device or by a network controller on the network.

30 Claims, 6 Drawing Sheets

(56) References Cited

U.S. PATENT DOCUMENTS

| | | | |
|---|---|---|---|
| 2012/0045012 A1 | 2/2012 | Alapuranen | |
| 2012/0140646 A1* | 6/2012 | Stephens | H04W 16/14 370/252 |
| 2014/0073322 A1* | 3/2014 | Henderson | H04W 16/24 455/435.1 |
| 2014/0269545 A1* | 9/2014 | Galeev | H04L 5/0026 370/329 |

OTHER PUBLICATIONS

Manitpornsut, et al., "Efficient Channel Assignment Algorithms for Infrastructure WLANs Under Dense Deployment," Oct. 26-29, 2009, pp. 329-337, MSWiM'09, Tenerife, Canary Islands, Spain.

* cited by examiner

USING COMMUNICATION DEVICES FOR PROVIDING NETWORK ACCESS

TECHNICAL FIELD

The present application generally relates to using communication devices for providing network access to other network devices on a network.

BACKGROUND

To provide connectivity for wireless devices, access points are deployed across enterprise environments. These access points have traditionally been dedicated and discrete devices that are mounted in preplanned locations and hardwired (e.g., via Ethernet) to underlying network infrastructure to provide local and Internet connectivity. Many enterprise environments also have internet protocol (IP) communication devices (e.g., desktop phones, mobile phones, etc.) that are deployed in some or all of the individual workspaces (e.g., cubicles) within the environments. Tremendous network efficiencies and cost savings may be achieved if at least some of the access points are replaced by IP communication devices that have the same or similar functionality to the access points.

SUMMARY

Described herein are various implementations of using communication devices to provide network access to network devices on a network. An exemplary communication device may provide voice communication to a network device or a device other than the network device, and also provide network access to the network device. The communication device may comprise a network communication unit to provide network access to the network device and a telecommunication unit to provide voice communication to the network device or the device other than the network device. In some implementations, the network communication unit and the telecommunication unit may be activated or deactivated by the communication device or by a network controller on the network. In some implementations, the network communication unit may be activated or deactivated based on the data traffic, whether other network providing devices are providing network access in an area where the communication device is located and/or in the area where the communication device is located.

In some implementations, the communication device may provide network access on a channel to the network devices. The communication device may store a channel occupancy status associated with the channel. The communication device may monitor an interference level associated with the channel. The communication device may determine whether to change a status of the communication device based on the monitored interference level. In some implementations, a non-transitory computer readable medium is provided for any of the network devices described herein. The non-transitory computer readable medium comprises computer executable code configured to perform the various methods described herein.

BRIEF DESCRIPTION OF THE DRAWINGS

Reference is now made to the following detailed description, taken in conjunction with the accompanying drawings. It is emphasized that various features may not be drawn to scale and the dimensions of various features may be arbitrarily increased or reduced for clarity of discussion. Further, some components may be omitted in certain figures for clarity of discussion.

Although similar reference numbers may be used to refer to similar elements for convenience, it can be appreciated that each of the various example implementations may be considered distinct variations.

DETAILED DESCRIPTION

Disclosed are techniques for employing wireless (e.g., Wi-Fi) access point functionality at communication devices in a network. These techniques may improve enterprise network infrastructure by providing additional network access points for handling network data traffic. An exemplary communication device may be a desktop phone (e.g., an IP desktop phone that enables placing and receiving calls over an IP network, such as a local intranet or the Internet, instead of the public switched telephone network (PSTN)). Such communication devices may be used to replace access points in a network or as additional access points to a network. By utilizing these communication devices, network bandwidth of the network may be increased without altering existing wiring to add standalone access points typically required for improving capacity of a network.

Figure 1:
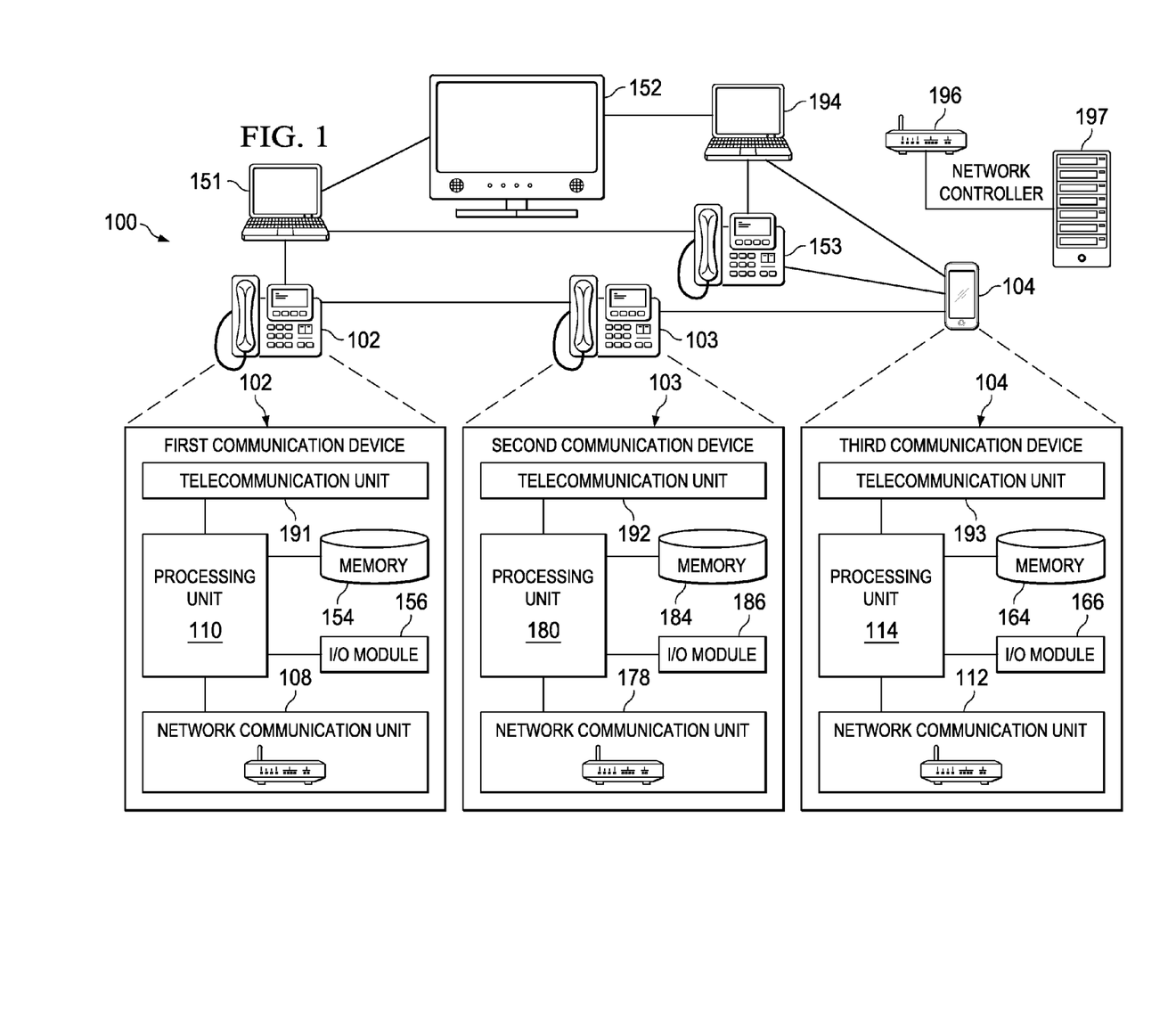
FIG. 1 illustrates a system environment for using communication devices to provide both network access to network devices on a network and voice communication capabilities, in accordance with various aspects of the present disclosure.

FIG. 1 illustrates a system environment for using communication devices for providing both telecommunication capabilities and network access to other network devices on a network 100. The network 100 includes a first communication device 102 (e.g., a non-portable phone such as a desk phone), a second communication device 103 (e.g., another desk phone), a third communication device 104 (e.g., a mobile phone), and other network devices. These other network devices may include a laptop 151, a television 152, a fourth communication device 153, and a second laptop 194. The other network devices are not limited to those shown in FIG. 1. In some implementations, the other network devices may also provide access point functionality. In some implementations, the access point functionality associated with any network device described herein may be software access point (soft AP) functionality. The first communication device 102 includes a network communication unit 108, a telecommunication unit 191, a processing unit 110, a memory 154, and an I/O module 156. The second communication device 103 includes a network communication unit 178, a telecommunication unit 192, a processing unit 180, a memory 184, and an I/O module 186. The third communication device 104 includes a network communication unit 112, a telecommunication unit 193, a processing unit 114, a memory 164, and an I/O module 166. As used herein, a processing unit may also be referred to as a processor. The other network devices may comprise the same or similar features, elements, components, or modules comprised in the first communication device 102. Switches may be used to turn on and turn off the network communication units 108, 112, and 178 and the telecommunication units 191, 193, and 192. Network communication units 108, 112, and 178 and telecommunication units 191, 193, and 192 may be selectively activated or deactivated. In some implementations, the activation or deactivation may be achieved via hardware switches or button on the communication devices or software switches that may be controlled by external computing devices.

As shown in FIG. 1, a network device may be connected to other network devices either directly or indirectly through one or more intermediate network devices. In some implementations, the network communication units 108, 112, and 178 may be communication units (wired or wireless) associated with any protocol and any frequency. Although wireless local area network (WLAN) is used as an example in this disclosure, this disclosure is not limited to WLAN communication. Network communication units 108, 112, and 178 may comprise circuitry for connecting to the network. In some implementations, network communication units 108, 112, and 178 may be connected to an Ethernet system. The first communication device 102, the second communication device 103, or the third communication device 104 may be an access point, a range extender that extends the range of an access point, a wired or wireless router, a network gateway, or any suitable network providing devices. The network providing devices may provide gateways or interfaces for other network devices to access the network or an external network such as the Internet. In some implementations, the first communication device 102, the second communication device 103, and the third communication device 104 may be referred to as network providing devices. A network controller may comprise a network router 196 and a network server 197. The network controller, using the network router 196 and the network server 197, provides access to another network (e.g., an external network such as the Internet). Although not shown, the network controller may be in wired or wireless communication with any of the network devices shown in FIG. 1, including the first communication device 102, the second communication device 103, and the third communication device 104. As an example, the network controller enables the first communication device 102, the second communication device 103, and the third communication device 104 to access the Internet. Telecommunication units 191, 193, and 192 may be used to perform voice communication, such as to place or receive calls directly or indirectly from the communication devices 102, 103 and 104, other network devices also comprising telecommunication units, or other devices comprising one or more telecommunication units and located inside or outside the network. It is noted that the voice connection may either be a direct network connection or an indirect network connection via one or more other network devices.

The processing units 110, 114, and 180 may control any of the other modules and/or functions performed by the various modules in the first communication device 102, the third communication device 104, and the second communication device 103, respectively. Any actions described as being taken by a processing unit may be taken by the processing unit alone or by the processing unit in conjunction with one or more additional modules. Additionally, while only one processing unit may be shown in certain devices, multiple processing units may be present. Thus, while instructions may be discussed as being executed by a processing unit, the instructions may be executed simultaneously, serially, or otherwise by one or multiple processing units. A processing unit may be implemented as one or more CPU chips and may be a hardware device capable of executing computer instructions. The processing unit may execute instructions, codes, computer programs, or scripts. The instructions, codes, computer programs, or scripts may be received from memory 154, 164, and 184, from I/O modules 156, 166, and 186, from network communication units 108, 112, and 178, or from telecommunication units 191, 193, and 192, comprised in the first communication device 102, the third communication device 104, and the second communication device 103, respectively.

In some implementations, the first communication device 102, the second communication device 103, and the third communication device 104 may use WLAN communication protocols to operate in an ad-hoc mode. In the ad-hoc mode, the network communication units 108, 112, and 178 may exchange data packets to establish direct WLAN communication links to each other or any other network device. For example, the network communication units 108, 112, and 178 may implement any suitable communication protocol, such as Wi-Fi (e.g., Wi-Fi Direct) communication protocols, tunneled direct link setup (TDLS) communication protocols, peer-to-peer communication protocols, wireless mesh communication protocols, etc. for operation in the ad-hoc mode.

In other implementations, the first communication device 102, the second communication device 103, and the third communication device 104 may use WLAN communication protocols (e.g., IEEE 802.11n communication protocols) to operate in an infrastructure mode. For example, in the infrastructure mode, the first communication device 102 and the third communication device 104, or any other network device, may communicate via the second communication device 103, the network controller, or another intermediate network device. For example, the network communication units 108 and 112 may exchange data packets via the intermediate network device to establish a WLAN communication link between the first communication device 102 and the third communication device 104. In some implementations, the network communication units 108, 112, and 178 can include one or more radio transceivers, analog front end (AFE) units, antennas, processing units, memory, other logic, and/or other components to implement the communication protocols and related functionality. In some implementations, in addition to WLAN communication protocols, the first communication device 102, the second communication device 103, and the third communication device 104 may be configured to communicate with other network devices using other suitable communication protocols (e.g., Bluetooth®, WiMAX, Ethernet, powerline communication (PLC), etc.).

As used herein, I/O modules 156, 166, and 186 may include modems, modem banks, Ethernet devices, universal serial bus (USB) interface devices, serial interfaces, token ring devices, fiber distributed data interface (FDDI) devices, wireless local area network (WLAN) devices or device components, radio transceiver devices such as code division multiple access (CDMA) devices, global system for mobile communications (GSM) radio transceiver devices, universal mobile telecommunications system (UMTS) radio transceiver devices, long term evolution (LTE) radio transceiver devices, worldwide interoperability for microwave access (WiMAX) devices, and/or other well-known devices for connecting to networks. I/O modules 156, 186, and 166 may also include liquid crystal displays (LCDs), touch screen displays, keyboards, keypads, switches, dials, mice, track balls, voice recognizers, card readers, paper tape readers, printers, video monitors, or other well-known input/output devices.

As used herein, memory 154, 164, and 184 may include random access memory (RAM), read only memory (ROM), or various forms of secondary storage. RAM may be used to store volatile data and/or to store instructions that may be executed by a processing unit. For example, the data stored may be a command, a current operating state of a device, an intended operating state of a device, etc. ROM may be a non-volatile memory device that may have a smaller memory capacity than the memory capacity of a secondary storage. ROM may be used to store instructions and/or data that may be read during execution of computer instructions. Access to both RAM and ROM may be faster than access to secondary storage. Secondary storage may be comprised of one or more disk drives or tape drives and may be used for non-volatile storage of data or as an over-flow data storage device if RAM is not large enough to hold all working data. Secondary storage may be used to store programs that may be loaded into RAM when such programs are selected for execution.

As used herein, networks may represent any form of network between connected machines and any other network elements, and may also represent a collection of machines or virtual machines operable to provide cloud computing services to users. Networks may include a public cloud or a private cloud. Networks may include routers, hubs, switches, firewalls, content switches, gateways, call controllers, and/or any other suitable components in any suitable form or arrangement. Networks may include, in whole or in part, one or more secured and/or encrypted Virtual Private networks (VPNs) operable to couple one or more network elements together by operating or communicating over elements of a public or external network. A network as described herein may be a wired or wireless network.

While the first communication device 102 and the second communication device 103 are shown as desk phones and the third communication device 104 is shown as a mobile phone, a network device (e.g., any network device shown in FIG. 1 including the first communication device 102, the second communication device 103, and the third communication device 104) may include any device with a network interface, which includes, but is not limited to, a network component, a computing device, a desktop computer, a node, a virtual machine, an instance, a host, a laptop, a mobile device, a fan, a light, a headless device (e.g., without a user interface), an air-conditioner, a thermostat, a microwave, a watch or wristband, glasses or other eyewear, a laptop computer, a smart screen, a tablet computer, a desktop computer, an electronic reader, a scanner, a portable media player, a mobile computing device, a mobile phone, a wearable device (e.g., wearable on a user's arm), headgear, a gaming device, or a kiosk. As used herein, the terms node, device, device component, network device, system, and apparatus are substantially equivalent and may be used interchangeably.

Figure 2:
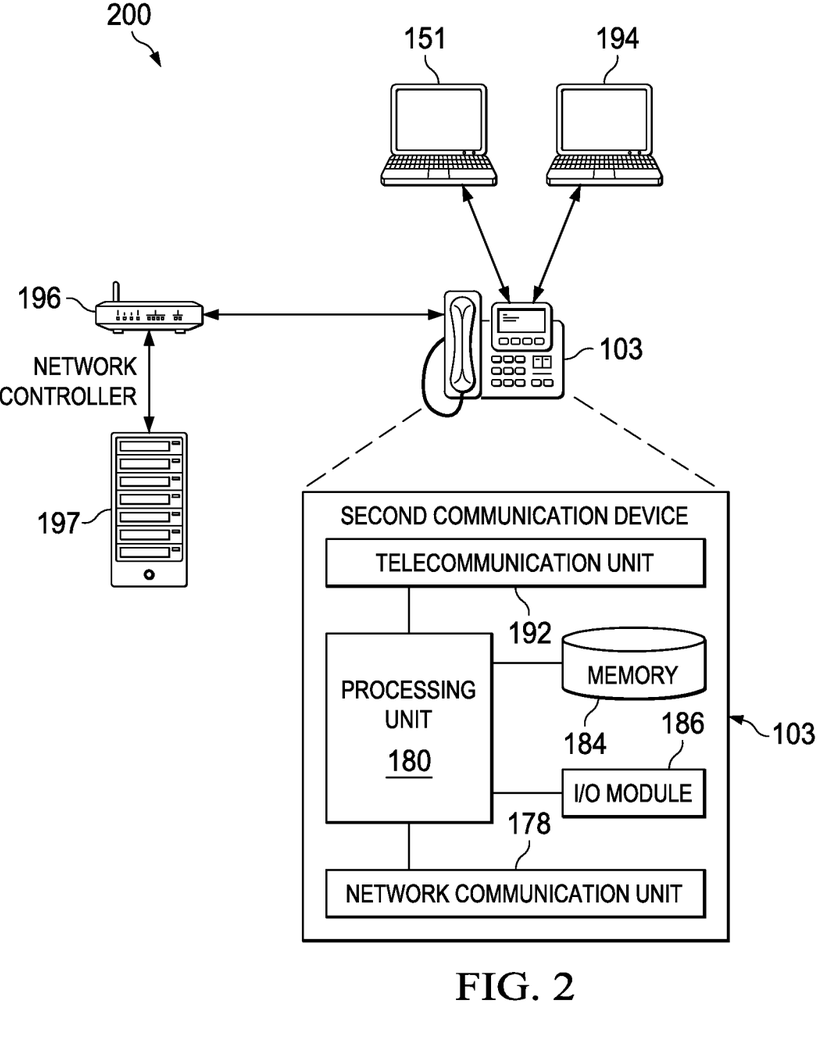
FIG. 2 illustrates a system environment for using a communication device to provide both network access to network devices on a network and provide voice communication to the network devices and devices other than the network devices, in accordance with various aspects of the present disclosure.

FIG. 2 illustrates a system environment for providing network access and voice communication using the second communication device 103 on a network 200. In this illustrated implementation, the network communication unit 178 may be configured to provide network access, via the network controller, to the laptops 151 and 194, and the telecommunication unit 192 may be configured to provide voice communication to the laptops 151 and 194. The telecommunication unit 192 may be configured to provide voice communication to devices other than devices on the network 200. These other devices may be situated outside the network 200. The memory 184 may provide data storage, including storage of a status of the second communication device 103. The status may be associated with activation or deactivation of the network communication unit 178 or the telecommunication unit 192. The processing unit 180 may control the network communication unit 178 or the telecommunication unit 192. Additionally or alternatively, in some implementations, the network communication unit 178 and the telecommunication unit 192 may be controlled by an external device external to the second communication device 103. An exemplary external device is the network controller.

Figure 3A:
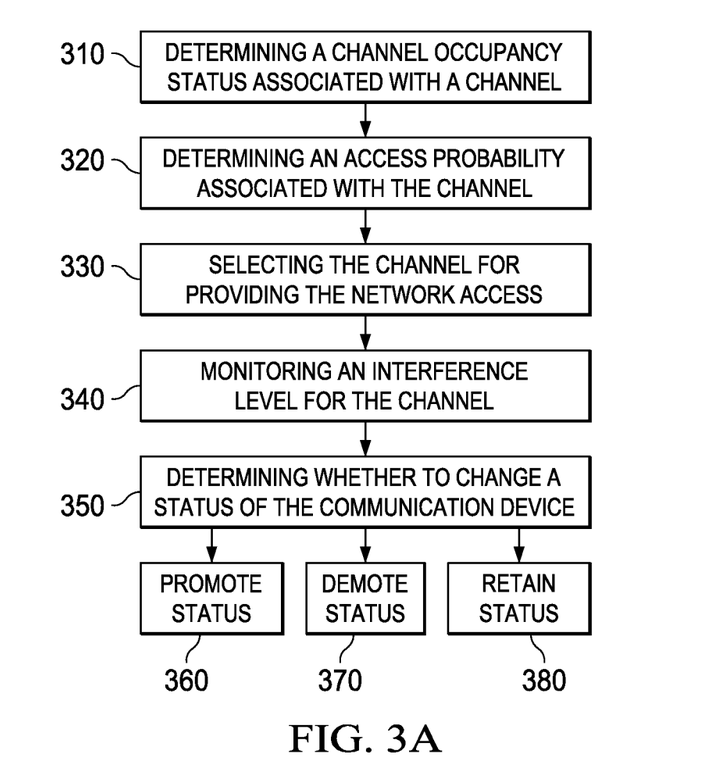
FIG. 3A illustrates a method for providing network access to network devices on a network using a communication device, in accordance with various aspects of the present disclosure.

FIG. 3A illustrates a method for providing network access to network devices using a communication device (e.g., the first communication device 102 in FIG. 1) comprising a network communication unit (e.g., the network communication unit 108 in FIG. 1) and a telecommunication unit (e.g., the telecommunication unit 191 in FIG. 1). A channel for providing network access using the communication device may be determined or selected based, at least in part, on a channel occupancy status associated with the channel. Therefore, at block 310 the method comprises determining a channel occupancy status associated with the channel. In some implementations, the channel occupancy status may be determined by the communication device. Channel occupancy statuses (e.g., in a channel occupancy status table) may be associated with multiple channels on the network. A channel occupancy status (also referred to as a "status") for the channel indicates whether network providing devices (e.g., an access point, a communication device (e.g., the second communication device 103 in FIG. 1), etc.), other than the communication device, are providing the network access on the channel. Each channel may be associated with a distinct frequency or a band of contiguous or noncontiguous frequencies. The status of the channel along with statuses of other channels may be stored in the communication device (e.g., in the memory 154 in FIG. 1) or may be stored at an external device (e.g., the network controller 196 and 197 in FIG. 1) and may be accessible by the communication device. Therefore, in some implementations, each communication device stores channel occupancy status information (e.g., a table of information). The information may be updated based, at least in part, on the change in status of the communication device as determined by the communication device or the network controller. The information may also be updated based, at least in part, on the presence or absence of other network providing devices on the channel, and their statuses. In some implementations, the status of a communication device may be changed manually by a user of the device, such as by activating or deactivating a switch on the device or transmitting a status change instruction from the user's computing device to the communication device.

The status of a communication device (e.g., the first communication device 102 in FIG. 1) comprises at least one member selected from the group consisting of an access point status, a pseudo access point status, a pseudo client status, and a client status. The statuses may have different priorities. For example, the access point status is of higher priority than the pseudo access point status; the pseudo access point status is of higher priority than the pseudo client status; the pseudo client status is of higher priority than the client status; and so on. A status may also be referred to as a rank. In some implementations, the communication device may promote or demote the communication device from a first status to a second status. In other implementations, the network controller (e.g., the network controller 196 and 197 in FIG. 1) in wired or wireless communication with the communication device may promote or demote the communication device from a first status to a second status. The network controller may change the status of the communication device and communicate this status to the communication device. In some implementations, the communication device cannot promote itself to a higher status from a client device status, and cannot demote itself to a lower status from an access point status. In some implementations, the network controller promotes the client device to a higher status from a client device status, and demotes the client device to a lower status from an access point status.

While having the access point status, the communication device provides network access to network devices, and may not change its status unless the change of status is initiated by the network controller. While having the client device status, the communication device may not provide network access to network devices, access the network via other network providing devices (e.g., the second communication device 103 in FIG. 1), or change its status unless the change of status is initiated by a network controller. While having the pseudo access point status and the pseudo client device status, the communication device may provide network access to network devices, may access the network via other network providing devices, and may change its status to a lower or higher status, wherein the change of status may be initiated by the communication device or by the network controller. In some implementations, the telecommunication unit (e.g., the telecommunication unit 191 in FIG. 1) of the communication device may be active when the communication device has any of the statuses described herein. In other implementations, the telecommunication unit of the communication device may be deactivated when the communication device has some of the statuses described herein (e.g., the access point status). The telecommunication unit may be deactivated by the communication device, or may be deactivated based, at least in part, on an instruction received from the network controller. In some implementations, the telecommunication unit may be deactivated after a predetermined period of inactivity. In some implementations, deactivating the telecommunication unit may trigger activation of the network communication unit (e.g., the network communication unit 108 in FIG. 1).

In some implementations, at block 320, the method further comprises determining an access probability of the channel. In some implementations, the access probability may be determined by the communication device (e.g., the first communication device 102 in FIG. 1). Determining the access probability of the channel may comprise determining the access probability of the channel is greater than access probabilities associated with other channels on the network. The access probability of each channel on the network is based, at least in part, on a channel occupancy status of each channel. As described previously, the channel occupancy status of a channel is based, at least in part, on the status of the communication device on the channel and the presence or absence of other network providing devices providing network access on the channel. The channel occupancy status information for multiple channels is initialized with a uniformly distributed access probability across multiple channels, e.g., the probability to choose a particular channel from multiple N channels is 1/N. As time passes by, the channel with the least interference has the highest access probability close to 1, and the channel with the most interference has the lowest access probability close to 0. As described herein, the interference on a channel is based, at least in part, on a number of network providing devices using the channel for and being activated to provide network access to network devices on the channel. The greater the number of network providing devices using the channel for providing network access, the more interference may be encountered by devices using the channel for accessing the network. A network providing device (e.g., a communication device) may be activated to provide network access if the network providing device does not have the lowest status (e.g., client device status). The network providing device may be activated to provide network access if it has the access point status, pseudo access point status, or pseudo client device status.

In some implementations, when the communication device (e.g., the first communication device 102 in FIG. 1) has the access point status, the communication device provides both wireless and wired network access to network devices. In some implementations, wireless access is not provided by the communication device unless the communication device has access point status. In some implementations, when the communication device has client device status, it does not provide network access (e.g., wireless or wired access). However, the network controller (e.g., the network controller 196 and 197 in FIG. 1) may be able to activate the network communication unit (e.g., the network communication unit 108 in FIG. 1) of the communication device when the communication device has client device status. When the network controller activates the network communication unit of the client device, the communication device may be promoted to a higher status and provide network access (e.g., wired or wireless access). At block 330, the method further comprises determining or selecting the channel for providing network access. The determination or selection may be based, at least in part, on the channel occupancy status (e.g., stored in the memory 154 in FIG. 1) associated with a channel as determined at block 310 and the access probability associated with a channel as determined at block 320. The determination or selection may be performed by the communication device (e.g., the first communication device 102 in FIG. 1).

At block 340, the method comprises monitoring an interference level for the channel selected in block 330. In some implementations, the interference level may be monitored by the communication device (e.g., the first communication device 102 in FIG. 1). The interference level is based, at least in part, on whether network providing devices (e.g., the second communication device 103 in FIG. 1), other than the communication device, are providing the network access on the same channel. At block 350, the method comprises determining whether to change a status (e.g., to a higher or lower status) of the communication device based, at least in part, on the interference level. For example, if the communication device determines an absence, for a threshold period, of another network providing device (e.g., an interfering network providing device) providing network access on the channel, the status of the communication device may be promoted from a second status in the group to a first status in the group due to low interference level in the channel (block 360). In this situation, the other network providing device may have a higher status than the communication device. If the communication device determines a presence of another network providing device (e.g., an interfering network providing device) providing network access on the channel, the status of the communication device may be demoted from a first status in the group to a second status in the group due to higher interference level in the channel caused by the other network providing device (block 370). In this situation, the other network providing device may have a higher status than the communication device. If the communication device determines that the communication device is an access point, the communication device may retain its status (block 380).

The actions illustrated in the blocks of FIG. 3A may be performed in any order, and are not limited to the order shown or described. For example, block 310 may be performed after block 320, before block 320, or simultaneously with block 320. Additionally, some blocks of the method may be skipped in some implementations.

Figure 3B:
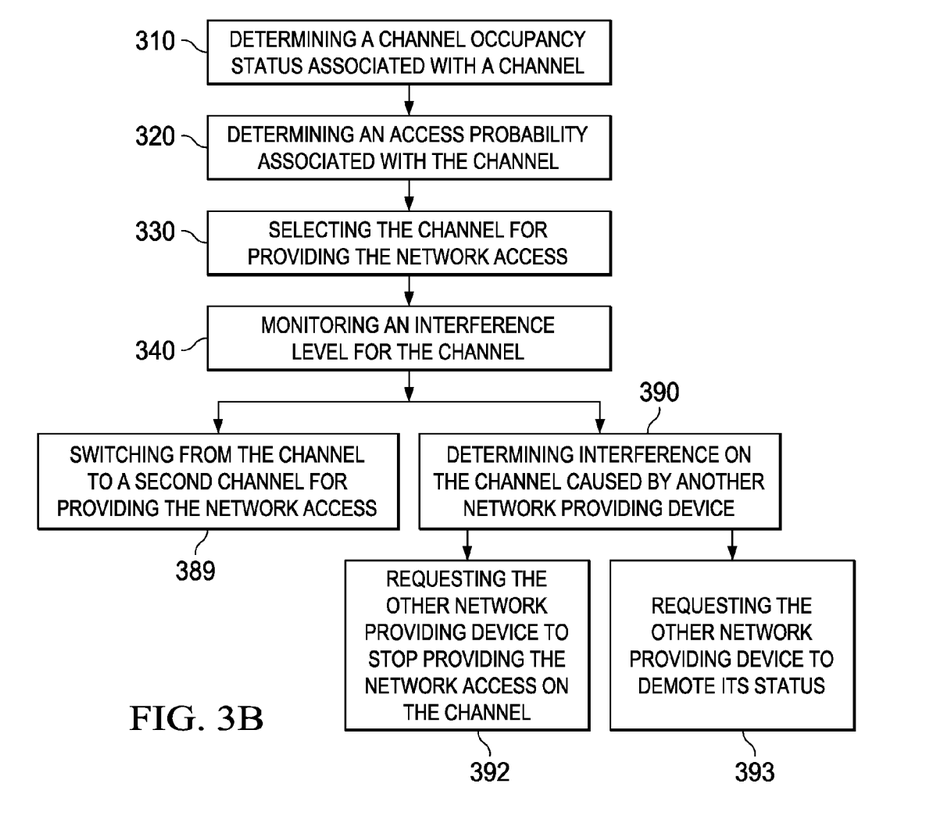
FIG. 3B illustrates another method for providing network access to network devices on a network using a communication device, in accordance with various aspects of the present disclosure.

FIG. 3B illustrates another method for providing network access to network devices using a communication device comprising a network communication unit and a telecommunication unit. Blocks 310 to 340 in FIG. 3B are equivalent to blocks 310 to 340 in FIG. 3A.

The communication device (e.g., the first communication device 102 in FIG. 1) may need a threshold amount of power to provide network access on a channel. The threshold amount of power may be associated with a threshold interference level on the channel. The communication device may need an amount (e.g., a minimum amount) of power greater than the threshold amount if the interference level on the channel is greater than the threshold interference level. Conversely, the communication device may need an amount (e.g., a minimum amount) of power less than the threshold amount if the interference level on the channel is less than the threshold interference level. At block 340, the method comprises monitoring the interference level on a channel by the communication device or by the network controller (e.g., the network controller in FIG. 1). The power level of the communication device may be modified by the communication device or by the network controller. Instead of changing the status of the communication device as performed at block 350 of FIG. 3A, the communication device or the network controller may determine that in order to retain the status of the communication device and/or not increase the power level of the communication device, the communication device can provide network access on a channel with lower interference compared to that encountered on the first channel. At block 389, the method further comprises either the communication device or the network controller switching the communication device from the channel (e.g., a first channel) to a second channel for providing the network access. This switching procedure is executed if the interference level on the second channel is less than the interference level on the first channel. The interference level may be directly proportional to the data transmission rate on a channel. Therefore, by using this switching procedure, a network device may be able to provide network access with a higher data transmission rate on a channel (e.g., the second channel) with less interference. In some implementations, the communication device may provide the network access on the second channel using a lower power level compared to that needed for providing the network access on the first channel.

In some implementations, as an alternative to block 389, at block 390, the method further comprises determining, by the communication device (e.g., the first communication device 102 in FIG. 1), interference on the channel caused by another network providing device (e.g., the second communication device 103 in FIG. 1). At block 392, the method further comprises directly communicating with the other network providing device and requesting the other network providing device to stop providing the network access on the channel. Alternatively, at block 393, the method further comprises requesting the other network providing device to demote its status to a status lower than the communication device. Since the other network providing device now has a demoted status, the other network providing device may either stop providing network access on the channel or provide network access at a lower data rate compared to the communication device. Alternatively, the communication device may request the network controller (e.g., the network controller 196 and 197 in FIG. 1) to request the other network providing device to stop providing network access on the channel or demote the status of the other network providing device.

In some implementations, the communication device may deactivate the telecommunication unit (e.g., the telecommunication unit 191 in FIG. 1) in response to the network communication unit (e.g., the network communication unit 108 in FIG. 1) being activated, or may deactivate the network communication unit in response to the telecommunication unit being activated. In other implementations, in response to an instruction from the network controller, the communication device may deactivate the telecommunication unit when the network communication unit is activated, or may deactivate the network communication unit in response to the telecommunication unit being activated. The telecommunication unit and the network communication unit may be activated or deactivated based on a change in status of the communication device as described herein. As used herein, deactivation of the network communication unit refers to either turning "off" a previously "on" network communication unit, or demoting the already "on" network communication unit, such that the network communication unit remains "on" but the telecommunication unit has greater access to the communication device's resources compared to the network communication unit. For example, if the communication device has a limited power supply or limited processing power, a greater percentage of the power supply or the processing power is allotted to the telecommunication unit compared to that allotted to the network communication unit. Similarly, activation of the telecommunication unit refers to either turning "on" a previously "off" telecommunication unit, or promoting the already "on" telecommunication unit, such that the telecommunication unit has greater access to the communication device's resources compared to the network communication unit. For example, if the communication device has a limited power supply or processing power, a greater percentage of the power supply or the processing power is allotted to the network communication unit compared to that allotted to the telecommunication unit. In other implementations, both the telecommunication unit and the network communication unit remain activated, or both the telecommunication unit and the network communication unit remain deactivated.

The actions illustrated in the blocks of FIG. 3B may be performed in any order, and are not limited to the order shown or described. For example, block 310 may be performed after block 320, before block 320, or simultaneously with block 320. Additionally, some blocks of the method may be skipped in some implementations.

Figure 4:
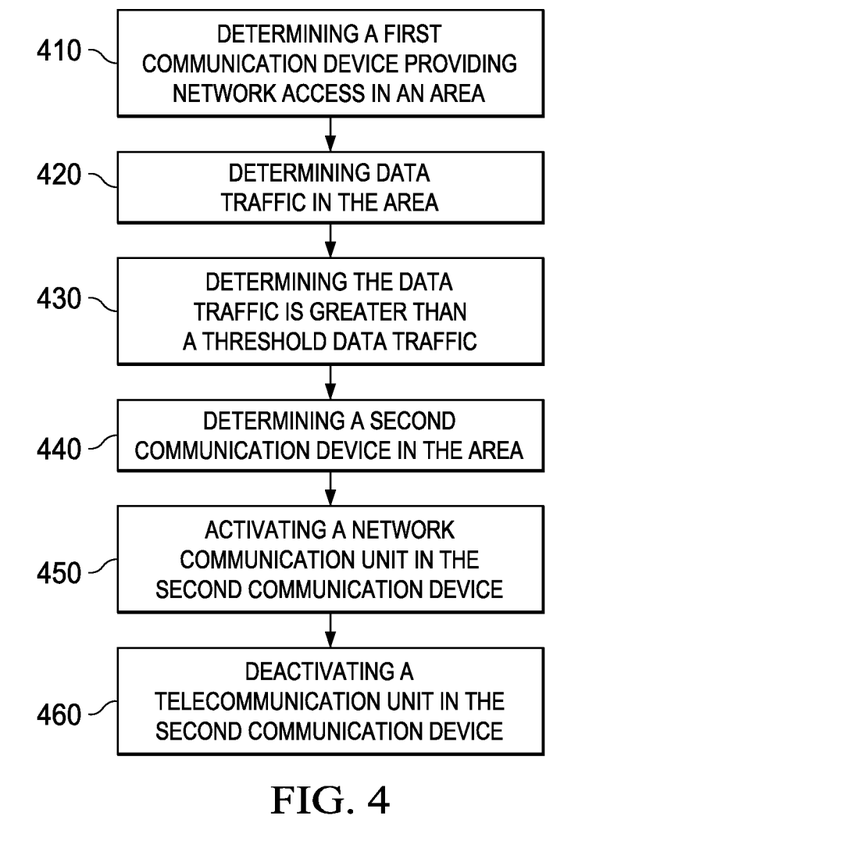
FIG. 4 illustrates a method for controlling network access in an area using a network controller comprising communication devices that provide network access to network devices on the network, in accordance with various aspects of the present disclosure.

FIG. 4 illustrates a method for controlling network access in an area using a network controller. At block 410, the method comprises determining that a first communication device (e.g., the first communication device 102 in FIG. 1) provides network access in an area (e.g., a geographical area). At block 420, the method comprises determining data traffic associated with network devices (e.g., laptop 151 in FIG. 1) in the area. At block 430, the method comprises determining the data traffic associated with network devices in the area is greater than a threshold data traffic. At block 440, the method comprises determining a second communication device (e.g., the second communication device 103 in FIG. 1) in the area. The second communication device is not currently providing network access in the area. At block 450, the method comprises activating a network communication unit (e.g., upgrading from a lower status (e.g., client device status) to a higher status (e.g., pseudo client device status, pseudo access point status, access point status)) in the second communication device such that the second communication device provides, in addition to the first communication device, the network access in the area. As illustrated in FIG. 1, an exemplary network communication unit in the second communication device 103 is the network communication unit 178. The first and second communication devices may provide network access on the same channel or on different channels. Therefore, at least some of the data traffic for network devices that access the network through the first communication device is offloaded to the second communication device. Optionally, in some implementations, at block 460, the method comprises deactivating a telecommunication unit (e.g., the telecommunication unit 192 in FIG. 1) in the second communication device.

The actions illustrated in the blocks of FIG. 4 may be performed in any order, and are not limited to the order shown or described. For example, block 410 may be performed after block 420, before block 420, or simultaneously with block 420. Additionally, some blocks of the method may be skipped in some implementations.

Figure 5:
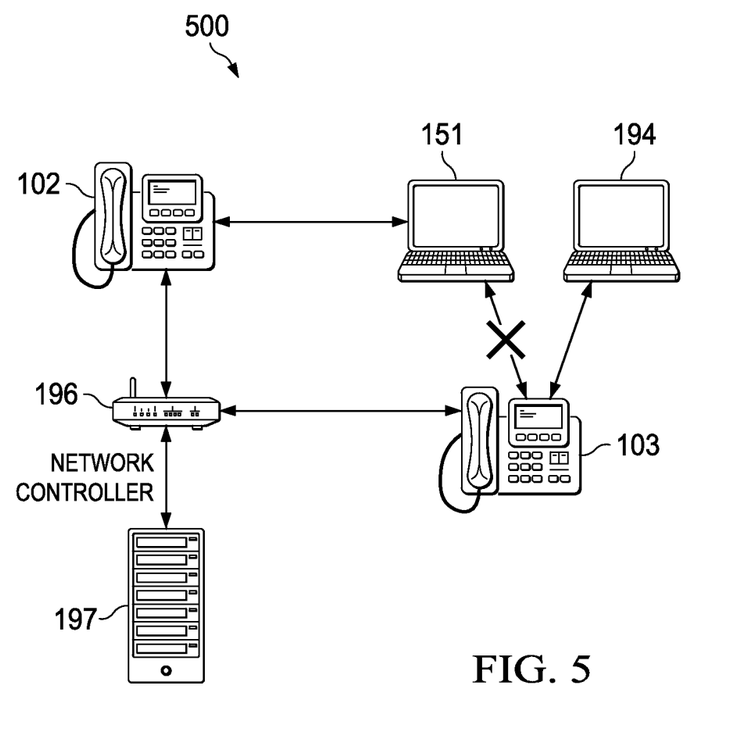
FIG. 5 illustrates a system environment for using two communication devices to provide both network access to network devices on a network and voice communication to the network devices and devices other than the network devices, in accordance with various aspects of the present disclosure.

FIG. 5 illustrates a system environment for providing network access and voice communication using the first communication device 102 and the second communication device 103 on a network 500. The system environment in FIG. 5 is a modified version of the system environment in FIG. 2. In FIG. 5, a network controller may determine that the data traffic associated with network devices (e.g., laptops 151 and 194) in the area associated with the second communication device 103 is greater than a threshold data traffic. Subsequently, the network controller may determine that the first communication device 102 is also in the area and does not currently provide network access in the area. The network controller may activate the network communication unit 108 in the first communication device 102. As a result, the first communication device 102 may now provide network access to the laptop 151, and the second communication device 103 may no longer provide network access to the laptop 151. Similar to FIG. 2, both the first communication device 102 and the second communication device 103 may be configured to provide network access via the network controller.

While various implementations in accordance with the disclosed principles have been described above, it should be understood that they have been presented by way of example only, and are not limiting. Thus, the breadth and scope of the implementations should not be limited by any of the above-described exemplary implementations, but should be defined only in accordance with the claims and their equivalents issuing from this disclosure. Furthermore, the above advantages and features are provided in described implementations, but shall not limit the application of such issued claims to processes and structures accomplishing any or all of the above advantages.

Various terms used herein have special meanings within the present technical field. Whether a particular term should be construed as such a "term of art," depends on the context in which that term is used. "Connected to," "in communication with," "communicably linked to," "in communicable range of" or other similar terms should generally be construed broadly to include situations both where communications and connections are direct between referenced elements or through one or more intermediaries between the referenced elements, including through the Internet or some other communicating network. "Network," "system," "environment," and other similar terms generally refer to networked computing systems that embody one or more aspects of the present disclosure. These and other terms are to be construed in light of the context in which they are used in the present disclosure and as those terms would be understood by one of ordinary skill in the art would understand those terms in the disclosed context. The above definitions are not exclusive of other meanings that might be imparted to those terms based, at least in part, on the disclosed context. In some implementations, the phrase "based on" may refer to "based, at least in part, on."

Words of comparison, measurement, and timing such as "at the time," "equivalent," "during," "complete," and the like should be understood to mean "substantially at the time," "substantially equivalent," "substantially during," "substantially complete," etc., where "substantially" means that such comparisons, measurements, and timings are practicable to accomplish the implicitly or expressly stated desired result.

Additionally, the section headings herein are provided for consistency with the suggestions under 37 C.F.R. 1.77 or otherwise to provide organizational cues. These headings shall not limit or characterize the implementations set out in any claims that may issue from this disclosure. Specifically and by way of example, although the headings refer to a "Technical Field," such claims should not be limited by the language chosen under this heading to describe the so-called technical field. Further, a description of a technology in the "Background" is not to be construed as an admission that technology is prior art to any implementations in this disclosure. Neither is the "Summary" to be considered as a characterization of the implementations set forth in issued claims. Furthermore, any reference in this disclosure to "implementation" in the singular should not be used to argue that there is only a single point of novelty in this disclosure. Multiple implementations may be set forth according to the limitations of the multiple claims issuing from this disclosure, and such claims accordingly define the implementations, and their equivalents, that are protected thereby. In all instances, the scope of such claims shall be considered on their own merits in light of this disclosure, but should not be constrained by the headings herein.

What is claimed is:

1. A communication device for providing network access to a network device on a network, the communication device comprising:

a network communication unit;
a processor coupled to the network communication unit and configured with processor-executable instructions to:
activate the network communication unit to provide network access to the network device;
store a status of the communication device and a plurality of channel occupancy statuses associated with a plurality of channels on the network, wherein a channel occupancy status for a channel indicates whether a network providing device other than the communication device is providing network access on the channel;
determine a first channel for providing network access to the network device on the network;
monitor an interference level for the first channel, wherein the interference level for the first channel is based on at least the channel occupancy status for the first channel; and
determine whether to change the status of the communication device based on at least the interference level.

2. The communication device of claim 1, wherein the communication device comprises a non-portable phone.

3. The communication device of claim 1, wherein the status comprises an access point status, a pseudo access point status, a pseudo client status, a client status or any combination thereof.

4. The communication device of claim 3, wherein the access point status is of higher priority than the pseudo access point status, wherein the pseudo access point status is of higher priority than the pseudo client status, and wherein the pseudo client status is of higher priority than the client status.

5. The communication device of claim 1, wherein the processor is further configured with processor-executable instructions to promote the status of the communication device from a second status to a first status in response to determining absence of a first network providing device providing network access on the first channel for a threshold period, wherein the status of the first network providing device has a higher priority than the status of the communication device.

6. The communication device of claim 1, wherein the processor is further configured with processor-executable instructions to demote the status of the communication device from a first status to a second status in response to determining presence of a first network providing device providing network access on the first channel, wherein the status of the first network providing device has a higher priority than the status of the communication device.

7. The communication device of claim 1, wherein the processor is further configured with processor-executable instructions to retain the status of the communication device in response to determining that the status of the communication device is an access point status.

8. The communication device of claim 1, wherein the processor is further configured with processor-executable instructions to configure the network communication unit to provide wireless network access to the network device in response to determining that the status of the communication device is an access point status.

9. The communication device of claim 1, wherein the processor is further configured with processor-executable instructions to change from the first channel to a second channel for providing the network access in response to a communication from a network controller.

10. The communication device of claim 1, wherein determining the first channel comprises determining that an access probability associated with the first channel is greater than access probabilities associated with other channels on the network, wherein the access probability associated with the first channel is based on at least the channel occupancy status for the first channel.

11. The communication device of claim 1, wherein the processor is further configured with processor-executable instructions to reduce a power of the communication device and to switch the communication device from providing network access on the first channel to providing network access on a second channel in response to a second interference level on the second channel being less than the interference level or in response to the second channel providing a higher data rate for network access compared to the first channel.

12. The communication device of claim 1, wherein the processor is further configured with processor-executable instructions to:
determine a first network providing device causing interference on the first channel; and
request the first network providing device to stop providing the network access on the first channel or request a network controller to stop the first network providing device from providing the network access on the first channel.

13. The communication device of claim 1, wherein the status of the communication device indicates whether the network communication unit is activated to provide network access.

14. A communication device for providing network access to network devices on a network comprising:
means for activating a network communication unit in the communication device to provide network access to the network devices;
means for storing a status of the communication device and a plurality of channel occupancy statuses associated with a plurality of channels on the network, wherein a channel occupancy status for a channel indicates whether a network providing device, other than the communication device, is providing network access on the channel;
means for determining a first channel on the network for providing the network access to the network devices;
means for monitoring an interference level for the first channel, wherein the interference level for the first channel is based on at least the channel occupancy status associated with the first channel; and
means for determining whether to change the status of the communication device based on at least the interference level.

15. The communication device of claim 14, further comprising means for updating the plurality of channel occupancy in response to changing the status of the communication device.

16. The communication device of claim 14, further comprising means for determining an interfering communication device on the first channel and transmitting a message to a network controller requesting deactivation of a second network communication unit in the interfering communication device.

17. The communication device of claim 14, further comprising:

means for determining whether to activate or deactivate a telecommunication unit in the communication device in response to changing the status of the communication device.

18. The communication device of claim 14, wherein the status of the communication device indicates whether the network communication unit is activated to provide network access.

19. A method for providing network access and voice communication by a device on a network, the method comprising:
   activating a network communication unit in the device to provide network access to a second device on the network;
   storing a status of the device and a plurality of channel occupancy statuses associated with a plurality of channels on the network, wherein a channel occupancy status for a channel indicates whether a network providing device, other than the device, is providing network access on the channel;
   determining a first channel for providing the network access to the second device, the first channel;
   monitoring an interference level for the first channel, wherein the interference level is based on at least the channel occupancy status for the first channel; and
   determining whether to change the status of the device based on at least the interference level.

20. The method of claim 19, wherein the status comprises an access point status, a pseudo access point status, a pseudo client status, a client status or any combination thereof.

21. The method of claim 20, wherein the access point status is of higher priority than the pseudo access point status, wherein the pseudo access point status is of higher priority than the pseudo client status, and wherein the pseudo client status is of higher priority than the client status.

22. The method of claim 19, further comprising promoting the status of the device from a second status to a first status in response to determining absence of a first network providing device providing the network access on the first channel for a threshold period, wherein the status of the first network providing device has a higher priority than the status of the device.

23. The method of claim 19, further comprising demoting the status of the device from a first status to a second status in response to determining presence of a first network providing device providing network access on the first channel, wherein the status of the first network providing device has a higher priority than the status of the device.

24. The method of claim 19, wherein determining the first channel comprises determining that an access probability associated with the first channel is greater than access probabilities associated with other channels on the network, wherein the access probability associated with the first channel is based on at least the channel occupancy status for the first channel.

25. The method of claim 19, further comprising changing from the first channel to a second channel for providing network access.

26. The method of claim 19, further comprising reducing a power of the device and switching the device from providing network access on the first channel to providing network access on a second channel in response to a second interference level on the second channel being less than the interference level or in response to the second channel providing a higher data rate for network access compared to the first channel.

27. The method of claim 19, further comprising:
   determining a first network providing device causing interference on the first channel; and
   requesting the first network providing device to stop providing the network access on the first channel or requesting a network controller to stop the first network providing device from providing the network access on the first channel.

28. The method of claim 19, wherein the status of the communication device indicates whether the network communication unit is activated to provide network access.

29. A non-transitory processor-readable storage medium having stored thereon processor-executable instructions configured to cause a processor of a communication device to perform operations comprising:
   activating a network communication unit in the communication device to provide network access to a second device on a network;
   storing a status of the communication device and a plurality of channel occupancy statuses associated with a plurality of channels on the network, wherein a channel occupancy status for a channel indicates whether a network providing device, other than the device, is providing network access on the channel;
   determining a first channel for providing the network access to the second device, the first channel;
   monitoring an interference level for the first channel, wherein the interference level is based on at least the channel occupancy status for the first channel; and
   determining whether to change the status of the device based on at least the interference level.

30. The non-transitory processor-readable storage medium of claim 29, wherein the status of the communication device indicates whether the network communication unit is activated to provide network access.

* * * * *